United States Patent [19]

Rock

[11] Patent Number: 4,816,527

[45] Date of Patent: Mar. 28, 1989

[54] POLYCARBONATE-SILOXANE POLYETHERIMIDE COPOLYMER BLENDS

[75] Inventor: John A. Rock, Becket, Mass.

[73] Assignee: General Electric Company, Pittsfield, Mass.

[21] Appl. No.: 87,322

[22] Filed: Aug. 20, 1987

[51] Int. Cl.$^4$ .............................................. C08L 77/00
[52] U.S. Cl. ..................................... 525/431; 525/433
[58] Field of Search ................................. 525/431, 433

[56] References Cited

U.S. PATENT DOCUMENTS

| | | | |
|---|---|---|---|
| 2,999,835 | 9/1961 | Goldberg | 260/42 |
| 3,028,365 | 4/1962 | Schnell et al. | 260/47 |
| 3,153,008 | 10/1964 | Fox | 260/47 |
| 3,334,154 | 8/1967 | Kim | 260/860 |
| 3,972,902 | 8/1976 | Heath et al. | 260/346.3 |
| 3,983,093 | 9/1976 | Williams et al. | 260/47 |
| 4,001,184 | 1/1977 | Scott | 260/47 |
| 4,098,750 | 7/1978 | Mark et al. | 260/30.8 R |
| 4,123,436 | 10/1978 | Holub et al. | 260/30.8 R |
| 4,131,575 | 12/1978 | Adelmann et al. | 260/17.4 R |
| 4,335,032 | 6/1982 | Rosenquist | 524/269 |
| 4,417,044 | 11/1983 | Parekh | 528/179 |
| 4,430,484 | 2/1984 | Quinn | 525/425 |
| 4,536,590 | 8/1985 | Brown | 556/453 |
| 4,548,997 | 10/1985 | Mellinger et al. | 525/433 |
| 4,579,909 | 4/1986 | Giles et al. | 525/148 |
| 4,584,338 | 4/1986 | Liu | 524/504 |
| 4,587,298 | 5/1986 | Miller | 525/67 |
| 4,616,042 | 10/1986 | Avakian | 521/81 |
| 4,626,572 | 12/1986 | Boutni et al. | 525/67 |
| 4,628,074 | 12/1986 | Boutni | 525/146 |
| 4,629,759 | 12/1986 | Rock | 525/66 |
| 4,632,962 | 12/1986 | Gallucci | 525/282 |

FOREIGN PATENT DOCUMENTS 257010 11/1969 U.S.S.R. .

OTHER PUBLICATIONS

Koton, M. M. and Florinski, F. S., *Zh. Org. Khin*, 4(5), 744 (1968).

*Primary Examiner*—Melvyn I. Marquis
*Attorney, Agent, or Firm*—Bernard, Rothwell & Brown

[57] ABSTRACT

A polymer blend containing a polycarbonate and a siloxane-polyetherimide copolymer. The blends of the invention have improved impact strength, particularly thick section impact strength, over the unmodified polycarbonates. In addition the blends have good physical properties, relatively low flammability and are resistant to environmental stress cracking and crazing.

12 Claims, No Drawings

POLYCARBONATE-SILOXANE POLYETHERIMIDE COPOLYMER BLENDS

BACKGROUND OF THE INVENTION

This invention relates to novel polymer blends which exhibit high impact strength, good retention of impact strength after heat aging, low flammability and good chemical resistance. More particularly, the invention relates to novel polycarbonate based polymer blends.

Polycarbonates are well-known polymers which have good property profiles, particularly with respect to impact resistance, electrical properties, optical clarity, dimensional rigidity and the like. Polycarbonates are high performance engineering thermoplastics, which are conveniently formed into a wide variety of useful articles by such techniques as extrusion, thermoforming, injection molding and blow molding.

One disadvantage of polycarbonates for certain applications is their relatively low critical thickness values, i.e., the thickness at which a discontinuity in Izod impact values occurs. For example, whereas typical notched Izod impact values for 3.2 mm thick test specimens are generally in the range of about 87 kgf-cm/cm, typical notched Izod impact values for 6.4 mm thick specimens are generally in the range of about 11 kgf-cm/cm. The relatively high notched Izod impact strengths of the 3.2 mm thick specimens are attributable to their being thinner than the critical thickness of the polymer, and therefore, upon impact, a hinged or ductile break occurs. The low notched Izod impact strength of the 6.4 mm thick specimens results from these specimens being thicker than the critical thickness of the polymer, and therefore, upon impact, a clean or brittle type break occurs. The low critical thickness values tend to limit the practical wall thickness of molded polycarbonate articles.

A further disadvantage often observed in articles fabricated from polycarbonates is their susceptability to environmental stress cracking and crazing. Environmental stress cracking and crazing refer to types of failure which are hastened by the presence of organic solvents, such as gasoline, acetone, heptane, carbon tetrachloride, and the like when such solvents are in contact with stressed parts fabricated from polycarbonates. The most significant effects are losses in impact strength and ductility.

Numerous polymers and additives have been blended with polycarbonates to improve the impact strength, environmental stress crack resistance and other properties of the polymers. To name but a few, the following polymers have been blended with polycarbonates to improve impact strengths and environmental stress crack resistance: polyacrylates (U.S. Pat. No. 4,616,042), polyolefins (U.S. Pat. No. 4,616,042), rubbery dienic polymers (U.S. Pat. No. 4,616,042), styrenic polymers (U.S. Pat. No. 4,616,042), graft modified polyolefins (U.S. Pat. No. 4,632,962), brominated polystyrene (U.S. Pat. No. 4,629,759), amorphous polyesters (U.S. Pat. No. 4,628,074), ethylene-propylene-dieneterpolymers (U.S. Pat. No. 4,626,572), hydrogenated AB diblock copolymers (U.S. Pat. No. 4,584,338), acrylate-styrene-acrylonitrile terpolymer and poly(methyl methacrylate) (U.S. Pat. No. 4,579,909). In addition, various silicone rubbers, silicone polysiloxane polymers and polyorganosiloxanes have been blended with polycarbonates to improve impact strength, chemical resistance and the like. See, e.g., U.S. Pat. Nos. 4,587,298, 4,536,590 and 4,335,032. Further, polydiorganosiloxane-polycarbonate block copolymers have been described as having improved impact strengths as compared to the unmodified polycarbonates. (See U.S. Pat. No. 4,616,042.)

Copending U.S. patent application Ser. No. 925,915, filed Nov. 3, 1986, discloses flame resistant polymer blends containing a polyetherimide, a siloxane-polyetherimide copolymer and a minor proportion of a polycarbonate. The siloxane-polyetherimide copolymer is said to improve the impact strength and processability of the polyetherimide, and the addition of the polycarbonate component is said to impart good chemical resistance to the resulting blends.

In the search for engineering thermoplastics capable of high performance applications, there is a continuing interest in developing polycarbonate based resins which have the advantageous physical and chemical properties of polycarbonates, yet have improved impact performance, particularly thick section impact strength, and resistance to environmental stress cracking and crazing.

SUMMARY OF THE INVENTION

In accordance with the present invention, novel polymer blend compositions contain a polycarbonate and a siloxane-polyetherimide copolymer. In general the siloxane-polyetherimide copolymer is employed in an amount sufficient to improve the impact performance of the polycarbonate.

In addition to enhanced impact properties, the polymer blends of this invention exhibit good retention of impact strengths after heat aging and good chemical resistance.

DETAILED DESCRIPTION OF THE INVENTION

The polycarbonates used in the blends of this invention are well-known, commercially available resins. They are high molecular weight, thermoplastic, aromatic polymers and include homopolycarbonates, copolycarbonates and copolyestercarbonates and mixtures thereof, which have average molecular weights of about 8,000 to more than 200,000, preferably from about 20,000 to about 80,000 and an intrinsic viscosity (I.V.) of from about 0.40 to about 1.5 dl/g, as measured in methylene chloride at 25 degrees C.

In one embodiment, the polycarbonates are derived from dihydric phenols and carbonate precursors and generally contain recurring structural units of the formula

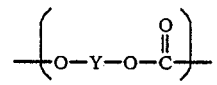

where Y is a divalent aromatic radical of the dihydric phenol employed in the polycarbonate-producing reaction.

Suitable dihydric phenols for producing polycarbonates include, for example, 2,2-bis(4-hydroxyphenyl)propane, bis(4-hydroxyphenyl)methane, 2,2-bis(4-hydroxy-3-methylphenyl)propane, 4,4-bis(4-hydroxyphenyl)heptane, 2,2-(3,5,3',5'-tetrachloro-4,4'-dihydroxyphenyl)propane, 2,2-(3,5,3',5'-tetrabromo-4,4'-dihydroxyphenyl)propane and (3,3'-dichloro-4,4'-dihydroxydiphenyl)methane. Other dihydric phenols which are also suitable for use in the preparation of the above polycarbonates are disclosed in U.S. Pat. Nos. 2,999,835, 3,028,365, 3,334,154 and 4,131,575, each of which is incorporated herein by reference.

It is of course possible to employ two or more different dihydric phenols or a copolymer of a dihydric phenol with a glycol or with a hydroxy- or acid-terminated polyester, or with a dibasic acid in the event a carbonate copolymer or interpolymer rather than a homopolymer is desired for use in the preparation of the blends of this invention. Blends of any of the above materials can also be employed to provide the aromatic polycarbonate. In addition, branched polycarbonates, such as are described in U.S. Pat. No. 4,001,184, can be utilized in the practice of this invention, as can blends of a linear polycarbonates and a branched polycarbonates.

The carbonate precursor employed can be either a carbony halide, a carbonate ester or a haloformate. The carbonyl halides which can be employed are carbonyl bromide, carbonyl chloride and mixtures thereof. Typical of the carbonate esters which can be employed are diphenyl carbonate; a di(halophenyl)carbonate, such as di(chlorophenyl)carbonate, di(bromophenyl)carbonate, di(trichlorophenyl)carbonate, di(tribromophenyl)carbonate, etc.; a di(alkylphenyl)carbonate, such as di(tolyl)carbonate, etc.; di(naphthyl)carbonate; di(chloronaphthyl)carbonate; or mixtures thereof. The suitable haloformates include bishaloformates of dihydric phenols (bischloroformates of hydroquinones, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

The polycarbonate may also be a copolyestercarbonate, as described by Clayton B. Quinn in U.S. Pat. No. 4,430,484 and the references cited therein, incorporated herein by reference. Preferred polyestercarbonates are those derived from the dihydric phenols and carbonate precursors described above and aromatic dicarboxylic acids or their reactive derivatives, such as the acid dihalides, e.g., dichlorides. A quite useful class of aromatic polyestercarbonates are those derived from bisphenol A, terephthalic acid, isophthalic acid or a mixture thereof or their respective acid chlorides; and carbonyl chloride. If a mixture of terephthalic acid and isophthalic acid is employed, the weight ratio of terephthalic acid to isophthalic acid may be from about 5:95 to about 95:5.

The polycarbonates used in the present blends can be manufactured by known processes, such as, for example, by reacting a dihydric phenol with a carbonate precursor such as diphenyl carbonate or carbonyl chloride in accordance with methods set forth in the above-cited patents and U.S. Pat. Nos. 4,098,750 and 4,123,436 or by transesterification techniques, such as are disclosed in U.S. Pat. No. 3,153,008, as well as other processes known to those skilled in the art.

The aromatic polycarbonates are typically prepared by employing a molecular weight regulator, an acid acceptor and a catalyst. The molecular weight regulators which can be employed include phenol, cyclohexanol, methanol, alkylated phenols, such as octylphenol, para-t-butylphenol, etc. Preferably phenol or an alkylated phenol is employed as the molecular weight regulator. The acid acceptor can be either an organic or an inorganic acid acceptor. A suitable organic acid acceptor is a tertiary amine and includes such materials as pyridine, triethylamine, dimethylaniline, tributylamine, etc. The inorganic acid acceptor can be a hydroxide, a carbonate, a bicarbonate, or a phosphate of an alkali or alkaline earth metal.

The catalysts which can be employed are those that typically aid the polymerization of the monomer with carbonyl chloride. Suitable catalysts include tertiary amines, such as triethylamine, tripropylamine, N,N-dimethylaniline, quaternary ammonium compounds, such as for example, tetraethylammonium bromide, tetra-n-heptylammonium iodide, cetyl triethylammonium bromide, tetra-n-propylammonium bromide, tetramethylammonium chloride, tetramethylammonium hydroxide, tetra-n-butylammonium iodide, benzyltrimethylammonium chloride and quaternary phosphonium compounds, such as for example, n-butyltriphenyl phosphonium bromide and methyltriphenyl phosphonium bromide.

Also included among the polycarbonates which may be used in the present blends are branched polycarbonates, wherein a polyfunctional aromatic compound is reacted with the monomer and carbonate precursor to provide a thermoplastic randomly branched polycarbonate. The polyfunctional aromatic compounds contain at least three functional groups which are carboxyl, carboxylic anhydride haloformyl, or mixtures thereof. Illustrative polyfunctional aromatic compounds which can be employed include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic anhydride, and the like. The preferred polyfunctional aromatic compounds are trimellitic anhydride and trimellitic acid or the acid halide derivatives.

The siloxane-polyetherimide copolymers employed in the blends of this invention consist essentially of repeating units of the formula

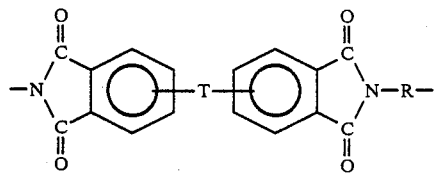

and repeating units of the formula

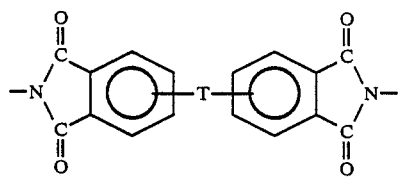

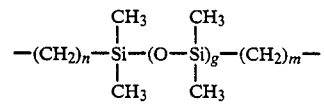

wherein T is —O— or a group of the formula

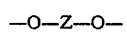

wherein the divalent bonds of the —O— or the —O—Z—O— group are in the 3,3', 3,4', 4,3' or 4,4' positions; Z is a member of the class consisting of (A)

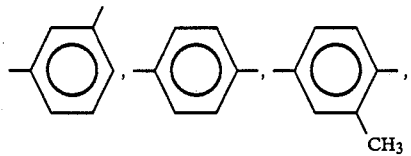

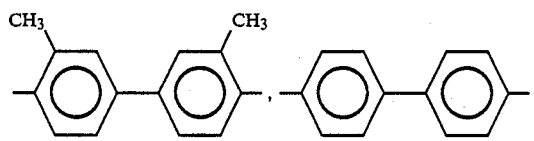

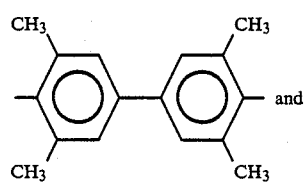

or (B) divalent organic radicals of the general formula

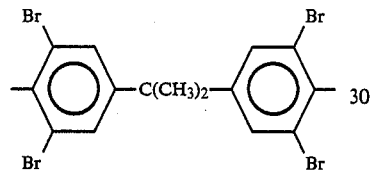

where X is a member selected from the group consisting of divalent radicals of the formulas

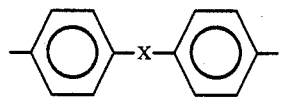

where y is an integer from 1 to about 5; and R is a divalent organic radical selected from the group consisting of (a) aromatic hydrocarbon radicals having from 6 to about 20 carbon atoms and halogenated derivatives thereof, (b) alkylene radicals having from 2 to about 20 carbon atoms cycloalkylene radicals having from 3 to about 20 carbon atoms, and (c) divalent radicals of the general formula

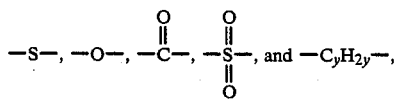

where Q is a member selected from the group consisting of

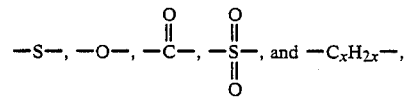

x is an integer from 1 to about 5; n and m independently are integers from 1 to about 10, and g is an integer from 1 to about 40. In preferred siloxane-polyetherimide copolymers, n and m independently are integers from 1 to about 5, and g is an integer from 5 to about 25, most preferably from about 9 to about 20.

The siloxane-polyetherimide copolymer may be a block copolymer, a random copolymer or an alternating copolymer. The organosiloxane-containing repeating units advantageously constitute from about 20 to about 50 mole %, preferably from about 25 to about 40 mole %, of the siloxane-polyetherimide copolymer.

The siloxane-polyetherimide copolymers can be prepared by well-known polyetherimide-producing processes. In general, the copolymers are prepared by reacting an aromatic bis(ether anhydride) of the formula

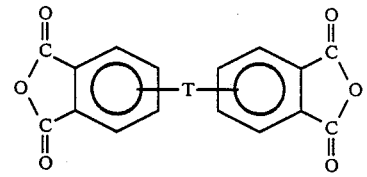

with an organic diamine of the formula

H$_2$N—R—NH$_2$ and an amine-terminated organosiloxane of the formula

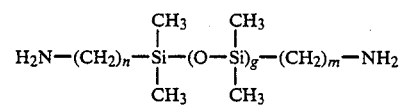

wherein T, R, n, m and g are as defined above.

In one embodiment, the polyetherimide repeating unit may, in addition to the etherimide repeating units described above, further contain polyimide repeating units of the formula

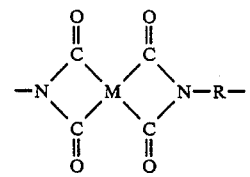

wherein R is defined as above, and M is selected from the group consisting of

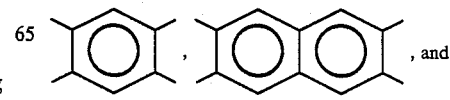

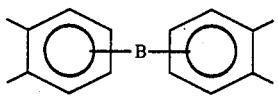

where B is —S— or —CO—. Polyetherimides containing such groups are described by Williams et al. in U.S. Pat. No. 3,983,093, incorporated herein by reference.

Bis(ether anhydride)s which may be used for preparing siloxane-polyetherimide copolymers include, for example,
1,3-bis(2,3-dicarboxyphenoxy)benzene dianhydride;
1,4-bis(2,3-dicarboxyphenoxy)benzene dianhydride;
1,3-bis(3,4-dicarboxyphenoxy)benzene dianhydride;
1,4-bis(3,4-dicarboxyphenoxy)benzene dianhydride; and
4,4'-bis(phthalic anhydride) ether.

A preferred class of aromatic bis(ether anhydride)s includes compounds of formulas I, II and III, which follow:

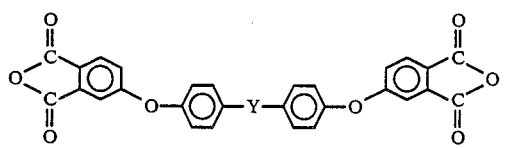

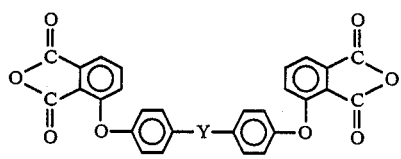

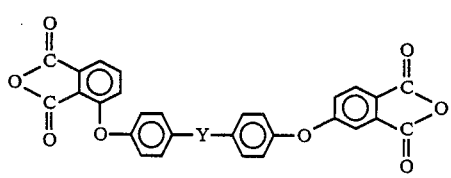

and mixture thereof, where Y is selected from the group consisting of —O—, —S—, —CO—, —C(CH$_3$)$_2$— and —SO$_2$. Aromatic Bis(ether anhydride)s of formula I include, for example:
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
4,4'-bis(3,4-dicarboxyphenoxy)benzophenone dianhydride;
4,4'-bis(3,4-dicarboxyphenoxy)diphenylsulfone dianhydride and mixtures thereof.

Aromatic bis(ether anhydride)s of formula II include, for example:
2,2-bis[4-(2,3-dicarboxyphenoxy)phenyl] propane dianhydride;
4,4'-bis(2,3-dicarboxyphenoxy)diphenyl ether dianhydride;
4,4'-bis(2,3-dicarboxyphenoxy)diphenyl sulfide dianhydride;
4,4'-bis(2,3-dicarboxyphenoxy)benzophenone dianhydride;
4,4'-bis(2,3-dicarboxyphenoxy)diphenylsulfone dianhydride and mixtures thereof.

Aromatic bis(ether anhydride)s of formula III may be, for example:
4-(2,3-dicarboxyphenoxy)-4'-(3,4-dicarboxyphenoxy) diphenyl-2,2-propane dianhydride;
4-(2,3-dicarboxyphenoxy)-4'-(3,4-dicarboxyphenoxy) diphenyl ether dianhydride;
4-(2,3-dicarboxyphenoxy)-4'-(3,4-dicarboxyphenoxy) diphenyl sulfide dianhydride;
4-(2,3-dicarboxyphenoxy)-4'-(3,4-dicarboxyphenoxy) benzophenone dianhydride;
4-(2,3-dicarboxyphenoxy)-4'-(3,4-dicarboxyphenoxy) diphenylsulfone dianhydride and mixtures thereof.

Some of the aromatic bis(ether anhydride)s described above are shown in U.S. Pat. No. 3,972,902 (Darrell Heath and Joseph Wirth). As described therein, bis(ether anhydride)s can be prepared by the hydrolysis, followed by dehydration, of the reaction product of a nitrosubstituted phenyl dinitrile with a metal salt of a dihydric phenol compound in the presence of a dipolar, aprotic solvent.

Additional aromatic bis(ether anhydride)s are shown by Koton, M. M., Florinski, F. S., Bessonov, M. I. and Rudakov, A. P. (Institute of Heteroorganic Compounds, Academy of Sciences, U.S.S.R.), U.S.S.R. patent No. 257,010, Nov. 11, 1969, Appl. May 3, 1967, and by Koton, M. M. and Florinski, F. S., *Zh. Org. Khin.*, 4(5), 774 (1968).

Examples of organic diamines which may be employed in preparing the siloxane-polyetherimides include:
m-phenylenediamine;
p-phenylenediamine;
4,4'-diaminodiphenylpropane;
4,4'-diaminodiphenylmethane (commonly named 4,4'-methylenedianiline);
4,4'-diaminodiphenyl sulfide;
4,4'-diaminodiphenyl sulfone;
4,4'-diaminodiphenyl ether (commonly named 4,4'-oxydianiline);
1,5-diaminonaphthalene;
3,3-dimethylbenzidine;
3,3-dimethoxybenzidine;
2,4-bis(beta-amino-t-butyl)toluene;
bis(p-beta-amino-t-butylphenyl) ether;
bis(p-beta-methyl-o-aminophenyl) benzene;
1,3-diamino-4-isopropylbenzene;
1,2-bis(3-aminopropoxy)ethane;
benzidine;
m-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecandiamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;

hexamethylenediamine;
heptamethylenediamine;
nonamethylenediamine;
decamethylenediamine,
and mixtures of such diamines.

The organic diamine and the amine-terminated organosiloxane may be mixed prior to reaction with the bis(ether anhydride)(s), thus forming a substantially random copolymer. Alternatively, block or alternating copolymers may be formed by first preparing prepolymers or by sequential addition of reactants, as is well-known in the polymer arts. In addition, it is contemplated that closely related siloxane-polyetherimide block copolymers may be formed by end functionalizing etherimide oligomers and organosiloxane oligomers and reacting such end-functionalized oligomers together. The blends of the present invention are intended to encompass blends of such block copolymers, although they might differ from the foregoing formulas slightly in the linkages between the polyorganosiloxane groups and the etherimide groups.

Numerous procedures are useful for preparing the siloxane-polyetherimide copolymers. A presently preferred procedure is described in U.S. Pat. No. 4,417,044, which is incorporated herein by reference.

The polycarbonates and siloxane-polyetherimide copolymers have been found to be compatible in all proportions. Thus the blends of the invention may comprise from about 1 to about 99% by wt. polycarbonate and from about 99 to about 1% by wt. siloxane-polyetherimide copolymer. Preferred blends contain an impact strength-enhancing amount of the siloxane-polyetherimide copolymer, which advantageously ranges from about 5 to about 50% by wt., preferably from about 10 to about 25% by wt. of the blend.

In accordance with this invention, it has been found that blending a siloxane-polyetherimide copolymer with a polycarbonate significantly improves the impact performance, particularly the thick section impact strength, of the polycarbonate. In addition, such blends retain their impact strengths after heat aging better than the unmodified polycarbonate. The latter property is particularly important in applications in which sheets of the polymer are formed into articles by thermoforming.

Another important property of the blends of this invention is their relatively low flammability. Blends in accordance with this invention have been found to pass Underwriters Laboratories test UL94 V-0 at 0.062 inch thickness, whereas, the unmodified polycarbonate resin is rated at UL94 V-2 at the same thickness.

Incorporation of minor amounts of siloxane-polyetherimide copolymers into polycarbonate does not deleteriously affect the physical properties of the polycarbonate to a significant extent. For example, the heat distortion temperature of the polycarbonate is substantially maintained. This latter property is surprising in view of the low heat distortion temperature of the siloxane-polyetherimide copolymer. In addition, the environmental stress crack resistance of the present blends is enhanced over that of the unmodified polycarbonate resins.

The present invention is further illustratd by the following examples, which are not intended to be limiting.

EXAMPLES 1-11

Polymer blends described in Table I below were prepared by a conventional melt-blending procedure using a laboratory extruder. The blends were extruded into small diameter strands, which were chopped into pellets for further molding into test parts.

The polycarbonate resins employed in these experiments are commercially available resins, sold by General Electric Company, under the trademark, Lexan ®. The polycarbonate was the reaction product of bisphenol A and carbonyl chloride. It had an intrinisc viscosity of about 0.7 dl/g as measured in chloroform solution at 25° C.

The copolyestercarbonate was prepared by reacting a 93:7 by wt. mixture of isophthaloyl chloride and terephthoyl chloride with bisphenol A and carbonyl chloride. The resulting copolymer contained 80% by wt. of the ester component and 20% by wt. of the carbonate component. This material is sold by General Electric Company, Pittsfield, Mass. U.S.A. under the trademark Lexan ® PPC-4701.

The siloxane polyetherimide copolymer is the reaction product of a mixture of m-phenylenediamine and an amine-terminated organosiloxane, with 2,2-bis[4-(3,4-dicarboxyphenoxy)phenyl]propane dianhydride. The siloxane polyetherimide copolymer designated in Table I as type A is a block copolymer prepared from BPA-DA and a mixture of 60 mole % m-phenylenediamine and 40 mole % of an amine-terminated organosiloxane of the formula provided above, wherein n and m are 3 and g has an average value of 9. The siloxane polyetherimide copolymer designated type B is the same as type A, except that the diamine component contains 30 mole % of the amine-terminated organosiloxane and the average value of g is 15. The siloxane polyetherimide copolymer designated type C is the same as type A, except that it is a random, rather than block, copolymer.

The data provided in Table I show that the blends of the present invention possess excellent physical properties, including superior impact strengths, lower flammabilities and better heat stabilities than corresponding unmodified polycarbonates.

TABLE I

| Example No. | Polycarbonate conc. (wt. %) | Copolyester carbonate (wt. %) | Siloxane Polyetherimide conc. (wt. %) | Siloxane Polyetherimide type | Heat Deflection Temp[1] (°C.) | Notched Izod Impact[2] (Ft. lb./in.) | Notched Izod Impact After 22 hrs. at 250° F. (Ft. lb./in.) | Notched Izod Impact[2] ¼" Thick ft. lb/in. | Tensile Strength @ Yield[3] (psi) |
|---|---|---|---|---|---|---|---|---|---|
| 1 | 90 | — | 10 | A | 134 | 14.3 | 12.5 | 15.2 | 8,600 |
| 2 | 90 | — | 10 | B | 130 | 14.8 | — | 16.1 | 8,500 |
| 3 | 90 | — | 10 | C | 126 | 14.3 | — | 14.5 | 8,100[4] |
| 4 | 75 | — | 25 | A | 125 | 12.4 | — | — | 8,000 |
| 5 | 75 | — | 25 | B | 126 | 13.0 | — | 12.6 | 7,600 |
| 6 | 75 | — | 25 | C | 122 | 13.5 | — | 11.6 | 8,300 |
| 7 | 25 | — | 75 | A | 82 | 3.6 | — | — | 6,500[4] |
| 8 | — | 90 | 10 | A | 151 | 5.8 | — | — | 9,400 |
| 9 | — | 75 | 25 | C | 145 | 9.2 | — | — | 8,700 |

TABLE I-continued

| | | | | | | | | | |
|---|---|---|---|---|---|---|---|---|---|
| 10 | 100 | — | — | — | 134 | 15.8 | 10.2 | 2.8 | 9,000 |

| Example No. | Tensile Elongation @ Yield[3] (%) | Tensile Elongation Ultimate[3] (%) | Flexural Modulus[5] (psi) | Flexural Strength[5] (psi) | UL94 Flammability[6] at 1/16" |
|---|---|---|---|---|---|
| 1 | 6.6 | 112 | 333,500 | 13,700 | V-O |
| 2 | 6.2 | 91 | 295,900 | 11,900 | — |
| 3 | 5.9 | 88 | 307,500 | 12,300 | V-O |
| 4 | 5.8 | 73 | 300,400 | 11,700 | V-O |
| 5 | 5.9 | 94 | 259.800 | 10,200 | V-O |
| 6 | 5.9 | 71 | 296,200 | 11,900 | — |
| 7 | 5.2 | 21 | 232,300 | 9,500 | V-O |
| 8 | 6.9 | 39 | 306,500 | 13,400 | V-O |
| 9 | 6.7 | 39 | 282,300 | 12,700 | — |
| 10 | 6.6 | 105 | 357,100 | 14,200 | Burned |

Footnotes to Table I
[1] Determined by ASTM procedure D648.
[2] Determined by ASTM procedure D256.
[3] Determined by ASTM procedure D638, using a 2"/min. crosshead speed.
[4] Determined by ASTM procedure D638, except @ 0.2"/min. crosshead speed.
[5] Determined by ASTM procedure D790.
[6] Determined by the procedure described in Underwriters Laboratories Bulletin No. 94.

EXAMPLES 12-13

A polycarbonate/siloxane polyetherimide copolymer blend was tested for environmental stress crack resistance by the following procedure. Test bars measuring 2.5"×0.5"×0.125" were prepared from unmodified polycarbonate and the polymer blend described in Example 1. These bars were mounted on a curved fixture such that the outer surfaces were subjected to 0.69% strain (i.e. the outer surfaces of the bars were stretched 0.69% of their length). Methylethylketone was applied to the surfaces at fifteen minute intervals. The outer surfaces were completely wetted with the solvent using a cotton-tipped applicator and then allowed to dry. The test bar prepared from unmodified polycarbonate failed (i.e., cracked) after 1.75 hours and the test bar prepared from the polycarbonate/siloxane polyetherimide blend was still intact after 4.25 hours.

I claim:

1. A polymer blend which consists essentially of from 1% to about 99% by weight of a polycarbonate containing repeating units of the formula

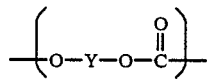

wherein Y is a divalent aromatic residue of a dihydric phenol and from about 99% to about 1% by weight of a siloxane-polyetherimide copolymer which consists essentially of repeating units of the formula

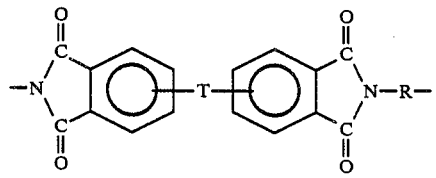

and repeating units of the formula

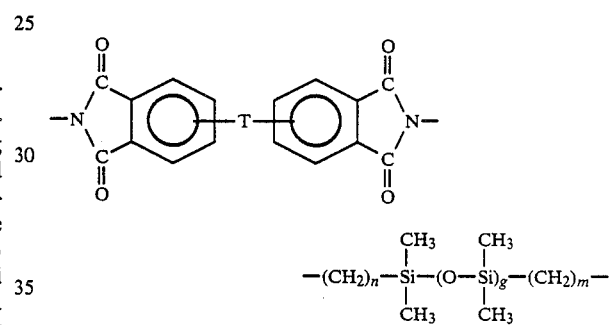

wherein T is —O— or a group of the formula

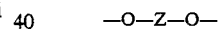

wherein the divalent bonds of the —O— or the —O—Z—O— group are in the 3,3', 3,4', 4,3' or 4,4' positions; Z is a member selected from the group consisting of (A)

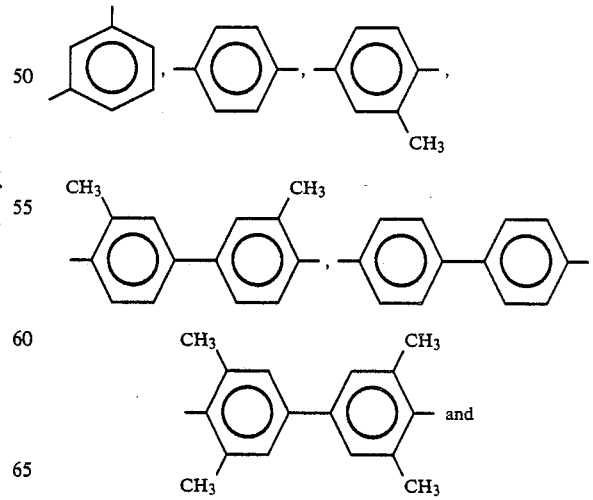

-continued

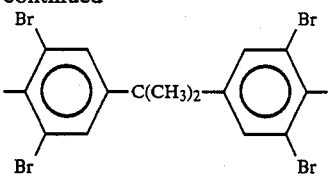

and (B) divalent organic radicals of the general formula

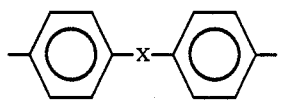

where X is a member selected from the group consisting of divalent radicals of the formulas

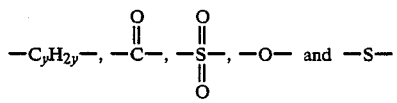

where y is an integer from 1 to about 5; and R is a divalent organic radical selected from the group consisting of (a) aromatic hydrocarbon radicals having from 6 to about 20 carbon atoms and halogenated derivatives thereof, (b) alkylene radicals having from 2 to about 20 carbon atoms, cycloalkylene radicals having from 3 to about 20 carbon atoms, and (c) divalent radicals of the general formula

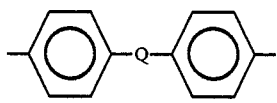

where Q is a member selected from the group consisting of

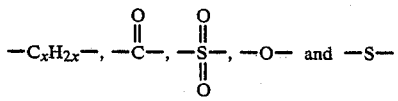

x is an integer from 1 to about 5, n and m independently are integers from 1 to about 10 and g is an integer from about 5 to about 25.

2. The polymer blend of claim 1, containing an impact resistance-enhancing amount of the siloxane-polyetherimide copolymer.

3. The polymer blend of claim 2, containing from about 50% by wt. to about 95% by wt. of the polycarbonate and from about 5% by wt. to about 50% by wt. of the siloxane-polyetherimide copolymer.

4. The polymer blend of claim 3, containing from about 75% by wt. to about 90% by wt. of the polycarbonate and from about 10% by wt. to about 25% by wt. of the siloxane-polyetherimide copolymer.

5. The polymer blend of claim 1, 2, 3 or 4, wherein n and m independently are integers from 1 to about 5.

6. The polymer blend of claim 5, wherein the organosiloxane-containing repeating units constitute from about 20 to about 50 mole % of the siloxane-polyetherimide copolymer.

7. The polymer blend of claim 5, wherein the organosiloxane-containing repeating units constitute from about 25 to about 40 mole % of the siloxane-polyetherimide copolymer.

8. The polymer blend of claim 5, wherein the siloxane-polyetherimide copolymer further contains a minor proportion of repeating units of the formula

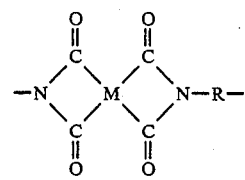

wherein M is selected from the group consisting of

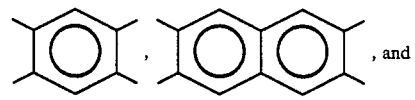, and

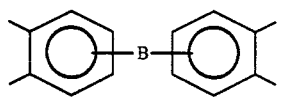

wherein B is —CO— or —SO$_2$—.

9. The polymer blend of claim 1, 2, 3 or 4, wherein Y is a divalent aromatic residue of a dihydric phenol selected from the group consisting of 2,2-bis(4-hydroxyphenyl)propane, bis(4-hydroxyphenyl)-methane, 2,2-bis(4-hydroxy-3-methylphenyl)propane, 4,4-bis(4-hydroxyphenyl)heptane, 2,2-(3,5,3′,5′-tetrachloro-4,4′-dihydroxyphenyl)propane, 2,2-(3,4,3′,5′-tetrabromo-44′-dihydroxyphenyl)propane and 3,3′-dichloro-4,4′-dihydroxydiphenyl)methane.

10. The polymer blend of claim 9, wherein the dihydric phenol is 2,2-bis(4-hydroxyphenyl)propane.

11. The polymer blend of claim 9, wherein the polycarbonate is a copolyestercarbonate derived from an aromatic dihydric phenol, a carbonate precursor, and one or more aromatic dicarboxylic acids or their reactive derivatives.

12. The polymer blend of claim 11, wherein the aromatic dicarboxylic acid is isophthalic acid, terephthalic acid or a mixture thereof.

* * * * *

UNITED STATES PATENT AND TRADEMARK OFFICE
CERTIFICATE OF CORRECTION

PATENT NO.  : 4,816,527
DATED       : March 28, 1989
INVENTOR(S) : John A. Rock

It is certified that error appears in the above-identified patent and that said Letters Patent is hereby corrected as shown below:

```
Column 1, line 7, "strength" should be --strengths--.
Column 3, line 19, "carbony halide" should be
         --carbonyl halide--.
Column 8, lines 28 and 29, "Zh. Org. Khin." should be
         underlined.
```

Signed and Sealed this

Twenty-first Day of January, 1992

Attest:

HARRY F. MANBECK, JR.

*Attesting Officer*          *Commissioner of Patents and Trademarks*